(12) United States Patent
Bian

(10) Patent No.: US 11,543,630 B2
(45) Date of Patent: Jan. 3, 2023

(54) CAMERA OPTICAL LENS

(71) Applicant: AAC Optics (Changzhou) Co., Ltd., Changzhou (CN)

(72) Inventor: Xuqi Bian, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 226 days.

(21) Appl. No.: 17/129,912

(22) Filed: Dec. 22, 2020

(65) Prior Publication Data

US 2021/0294076 A1    Sep. 23, 2021

(30) Foreign Application Priority Data

Mar. 19, 2020   (CN) .......................... 202010193779.9

(51) Int. Cl.
  *G02B 13/00* (2006.01)
  *G02B 9/60* (2006.01)
  *G02B 27/00* (2006.01)

(52) U.S. Cl.
  CPC ........... *G02B 13/0045* (2013.01); *G02B 9/60* (2013.01); *G02B 27/0025* (2013.01)

(58) Field of Classification Search
  CPC ... G02B 9/60; G02B 13/0045; G02B 27/0025
  See application file for complete search history.

(56) References Cited

U.S. PATENT DOCUMENTS

| 11,435,561 | B2 * | 9/2022 | Chiang | .......... G02B 15/145109 |
| 2016/0011399 | A1 * | 1/2016 | Hashimoto | .............. G02B 9/60 359/714 |
| 2020/0209591 | A1 * | 7/2020 | Sun | .......................... G02B 9/60 |

* cited by examiner

*Primary Examiner* — Jack Dinh
(74) *Attorney, Agent, or Firm* — W&G Law Group

(57) ABSTRACT

A camera optical lens includes first to fifth lenses. The camera optical lens satisfies: $1.50 \leq (R5+R6)/(R5-R6)$; $0.40 \leq d4/d6 \leq 1.25$; $1.00 \leq TTL/IH \leq 1.30$; and $1.00 \leq (R3+R4)/(R3-R4) \leq 2.40$, where R3 and R4 denote curvature radiuses of an object side surface and an image side surface of the second lens, respectively; R5 and R6 denote curvature radiuses of an object side surface and an image side surface of the third lens, respectively; d4 denotes an on-axis distance from the image side surface of the second lens to the object side surface of the third lens; d6 denotes an on-axis distance from the image side surface of the third lens to an object side surface of the fourth lens; IH denotes an image height of the camera optical lens; and TTL denotes a total optical length. The camera optical lens has good optical performance while satisfying design requirements for ultra-thin, wide-angle lenses having large apertures.

10 Claims, 9 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the development of camera technology, camera optical lenses are widely applied in various electronic products, such as smart phones and digital cameras. For the purpose of portability, people are increasingly pursuing thinner and lighter electronic products, and thus miniature camera lenses with good imaging quality therefore have become a mainstream in the market.

In order to obtain better imaging quality, the lens that is conventionally equipped in mobile phone cameras adopts a three-piece or four-piece lens structure. However, with the development of technology and the increasingly diverse demands of users, the pixel area of photosensitive devices is becoming smaller and smaller and the requirement of the system on the imaging quality is increasingly higher, such that a five-piece lens structure gradually emerges in lens designs. Although the common five-piece lens has good optical performance, its settings on refractive power, lens spacing and lens shape still have some irrationality, which results in that the lens structure cannot achieve a high optical performance while satisfying design requirements for wide-angle and ultra-thin lenses.

Therefore, it is urgent to provide a camera optical lens that has good optical performance and satisfies the requirements for large-aperture, wide-angle, and ultra-thin design.

SUMMARY

In view of the problems, the present disclosure aims to provide a camera optical lens, which can solve a problem that traditional camera optical lenses are not fully ultra-thinned, large-apertured and wide-angled.

A technical solution of the present disclosure is as follows: a camera optical lens sequentially includes, from an object side to an image side: a first lens having a positive refractive power, a second lens having a negative refractive power, a third lens having a negative refractive power, a fourth lens having a positive refractive power, and a fifth lens having a negative refractive power; wherein the camera optical lens satisfies following conditions: $1.50 \le (R5+R6)/(R5-R6)$; $0.40 \le d4/d6 \le 1.25$; $1.00 \le TTL/IH \le 1.30$; and $1.00 \le (R3+R4)/(R3-R4) \le 2.40$, where R3 denotes a curvature radius of an object side surface of the second lens; R4 denotes a curvature radius of an image side surface of the second lens; R5 denotes a curvature radius of an object side surface of the third lens; R6 denotes a curvature radius of an image side surface of the third lens; d4 denotes an on-axis distance from the image side surface of the second lens to the object side surface of the third lens; d6 denotes an on-axis distance from the image side surface of the third lens to an object side surface of the fourth lens; IH denotes an image height of the camera optical lens; and TTL denotes a total optical length from an object side surface of the first lens to an image plane of the camera optical lens along an optic axis.

As an improvement, the camera optical lens further satisfies a condition of $0.80 \le f1/f \le 1.10$, where f denotes a focal length of the camera optical lens; and f1 denotes a focal length of the first lens.

As an improvement, the camera optical lens further satisfies following conditions: $-5.03 \le (R1+R2)/(R1-R2) \le -1.44$; and $0.05 \le d1/TTL \le 0.19$, where R1 denotes a curvature radius of the object side surface of the first lens; R2 denotes a curvature radius of an image side surface of the first lens; and d1 denotes an on-axis thickness of the first lens.

As an improvement, the camera optical lens further satisfies following conditions: $-15.67 \le f2/f \le -3.12$; and $0.02 \le d3/TTL \le 0.09$, where f denotes a focal length of the camera optical lens; f2 denotes a focal length of the second lens; and d3 denotes an on-axis thickness of the second lens.

As an improvement, the camera optical lens further satisfies following conditions: $-957.13 \le f3/f \le -4.74$; and $0.03 \le d5/TTL \le 0.09$, where f denotes a focal length of the camera optical lens; f3 denotes a focal length of the third lens; and d5 denotes an on-axis thickness of the third lens.

As an improvement, the camera optical lens further satisfies following conditions: $0.28 \le f4/f \le 1.11$; $0.83 \le (R7+R8)/(R7-R8) \le 2.73$; and $0.07 \le d7/TTL \ge 0.47$, where f denotes a focal length of the camera optical lens; f4 denotes a focal length of the fourth lens; R7 denotes a curvature radius of the object side surface of the fourth lens; R8 denotes a curvature radius of an image side surface of the fourth lens; and d7 denotes an on-axis thickness of the fourth lens.

As an improvement, the camera optical lens further satisfies following conditions: $-1.22 \le f5/f \le -0.31$; $0.30 \le (R9+R10)/(R9-R10) \le 0.99$; and $0.03 \le d9/TTL \le 0.13$, where f denotes a focal length of the camera optical lens; f5 denotes a focal length of the fifth lens; R9 denotes a curvature radius of an object side surface of the fifth lens; R10 denotes a curvature radius of an image side surface of the fifth lens; and d9 denotes an on-axis thickness of the fifth lens.

As an improvement, the camera optical lens further satisfies a following condition: $FNO \le 2.25$, where FNO denotes an F number of the camera optical lens.

As an improvement, the camera optical lens further satisfies a condition of $FOV \ge 83°$, where FOV denotes a field of view of the camera optical lens.

As an improvement, the camera optical lens further satisfies a condition of $0.46 \le f12/f \le 1.79$, where f denotes a focal length of the camera optical lens; and f12 denotes a combined focal length of the first lens and the second lens.

The present disclosure has advantageous effects as below.

The camera optical lens according to the present disclosure achieves good optical performance while satisfying design requirements for ultra-thin, wide-angle lenses having large apertures, especially suitable for camera lens assembly of mobile phones and WEB camera lenses formed by CCD, CMOS and other imaging elements for high pixels.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
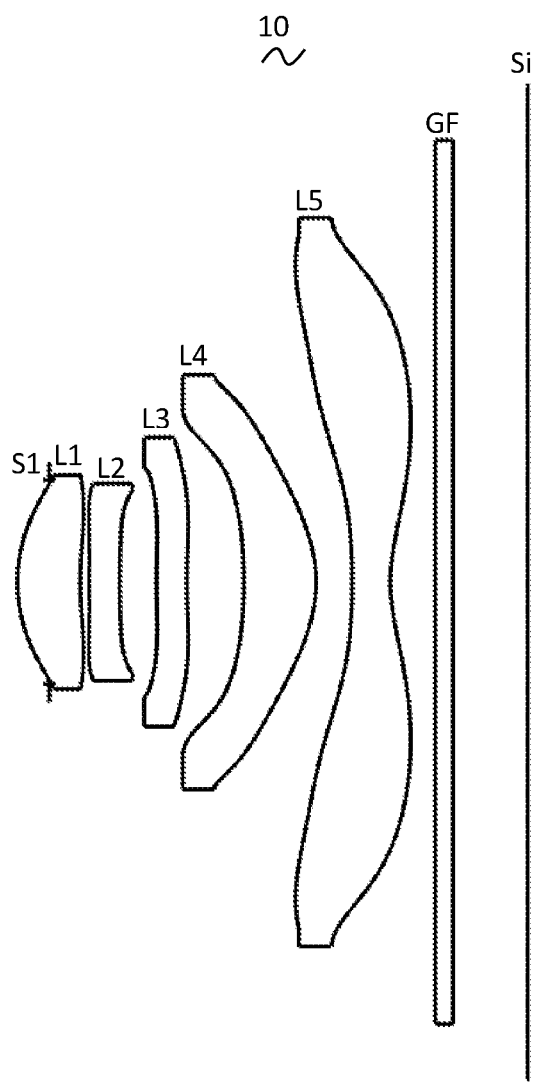
FIG. 1 is a schematic diagram of a structure of a camera optical lens in accordance with Embodiment 1 of the present disclosure.

Referring to FIG. 1-4, the present disclosure provides a camera optical lens 10 in Embodiment 1. In FIG. 1, a left side is an object side, and a right side is an image side. The camera optical lens 10 mainly includes, from an object side to an image side, an aperture S1, a first lens L1, a second lens L2, a third lens L3, a fourth lens L4, and a fifth lens L5. A glass filter (GF) is arranged between the fifth lens L5 and an image plane Si, and the glass filter (GF) can be a glass plate or can be an optical filter.

The first lens L1 is made of a plastic material, the second lens L2 is made of a plastic material, the third lens L3 is made of a plastic material, the fourth lens L4 is made of a plastic material, and the fifth lens L5 is made of a plastic material.

In the present embodiment, a curvature radius of an object side surface of the second lens L2 is defined as R3, a curvature radius of an image side surface of the second lens L2 is defined as R4, a curvature radius of an object side surface of the third lens L3 is defined as R5, a curvature radius of an image side surface of the third lens L3 is defined as R6, an on-axis distance from the image side surface of the second lens L2 to the object side surface of the third lens L3 is d4, an on-axis distance from the image side surface of the third lens L3 to an object side surface of the fourth lens L4 is d6, an image height of the camera optical lens 10 is defined as IH, and a total optical length from an object side surface of the first lens L1 to an image plane of the camera optical lens along an optic axis is TTL. The camera optical lens 10 should satisfy following conditions:

$$1.50 \le (R5+R6)/(R5-R6) \quad (1);$$

$$0.40 \le d4/d6 \le 1.25 \quad (2);$$

$$1.00 \le TTL/IH \le 1.30 \quad (3); \text{ and}$$

$$1.00 \le (R3+R4)/(R3-R4) \le 2.40 \quad (4).$$

The condition (1) specifies a shape of the third lens L3. This can alleviate the deflection of light passing through the lens while effectively reducing aberrations.

When d4/d6 satisfies the condition (2), a position of the third lens L3 can be effectively distributed, which is beneficial to improving the image quality.

The condition (3) specifies a ratio of the total length of the system to the image height, and under this condition, the system has the ultra-thin characteristics.

The condition (4) specifies a shape of the second lens L2. This condition facilitates the improvement of image quality.

Here, a focal length of the camera optical lens 10 is defined as f, and a focal length of the first lens L1 is defined as f1. The camera optical lens 10 should satisfy a condition of $0.80 \le f1/f \le 1.10$. When f1/f satisfies such a condition, the focal length f1 of the first lens L1 can be effectively distributed, so as to correct the aberration of the optical system, thereby improving the image quality.

In the present embodiment, the first lens L1 has a positive refractive power. The first lens L1 includes the object side surface being convex in a paraxial region and an image side surface being concave in the paraxial region.

A curvature radius of the object side surface of the first lens L1 is defined as R1, and a curvature radius of the image side surface of the first lens L1 is defined as R2. The camera optical lens 10 should satisfy a condition of $-5.03 \le (R1+R2)/(R1-R2) \le -1.44$, which can control a shape of the first lens L1, allowing the first lens L1 to effectively correct spherical aberrations of the system. As an example, $3.14 \le (R1+R2)/(R1-R2) \le -1.80$.

An on-axis thickness of the first lens L1 is defined as d1, and the total optical length from the object side surface of the first lens L1 to an image plane of the camera optical lens along an optic axis is defined as TTL. The camera optical lens 10 should satisfy a condition of $0.05 \le d1/TTL \le 0.19$, which can achieve the ultra-thin lenses. As an example, $0.09 \le d1/TTL \le 0.15$.

In the present embodiment, the second lens L2 has a negative refractive power, and the second lens L2 includes the object side surface being convex in a paraxial region and the image side surface being concave in the paraxial region.

The focal length of the camera optical lens 10 is defined as f, and a focal length of the second lens L2 is defined as f2. The camera optical lens 10 should satisfy a condition of $-15.67 \le f2/f \le -3.12$. By controlling the negative refractive power of the second lens L2 in an appropriate range, the aberration of the optical system can be advantageously corrected. As an example, $-9.80 \le f2/f \le -3.90$.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of $0.02 \le d3/TTL \le 0.09$, which can achieve the ultra-thin lenses. As an example, $0.04 \le d3/TTL \le 0.07$.

In the present embodiment, the third lens L3 has a negative refractive power, and the third lens L3 includes an object side surface being convex in a paraxial region and an image side surface being concave in the paraxial region.

The focal length of the camera optical lens 10 is f, and a focal length of the third lens L3 is f3. The camera optical lens 10 further satisfies a condition of $-957.13 \le f3/f \le -4.74$. The appropriate distribution of the refractive power leads to better imaging quality and a lower sensitivity of the system. As an example, $-598.21 \le f3/f \le -5.92$.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of $0.03 \le d5/TTL \le 0.09$. This can facilitate achieving ultra-thin lenses. As an example, $0.04 \le d5/TTL \le 0.08$.

In the present embodiment, the fourth lens L4 has a positive refractive power, and the fourth lens L4 includes an object side surface being concave in a paraxial region and an image side surface being convex in the paraxial region.

A focal length of the fourth lens L4 is f4, and the focal length of the camera optical lens 10 is f. The camera optical lens 10 further satisfies a condition of $0.28 \le f4/f \le 1.11$, which specifies a ratio of the focal length f4 of the fourth lens L4 to the focal length of the system. This condition facilitates improving the performance of the optical system. As an example, $0.45 \le f4/f \le 0.89$.

A curvature radius of the object side surface of the fourth lens L4 is defined as R7, and a curvature radius of the image side surface of the fourth lens L4 is defined as R8. The camera optical lens 10 should satisfy a condition of $0.83 \le (R7+R8)/(R7-R8) \le 2.73$, which specifies a shape of the fourth lens L4. This condition can facilitate the correction of an off-axis aberration with the development towards ultra-thin, wide-angle lenses. As an example, $1.33 \le (R7+R8)/(R7-R8) \le 2.18$.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of $0.07 \le d7/TTL \le 0.47$, which can achieve the ultra-thin lenses. As an example, $0.11 \le d7/TTL \le 0.38$.

In the present embodiment, the fifth lens L5 has a negative refractive power, and the fifth lens L5 includes an object side surface being concave in a paraxial region and an image side surface being concave in the paraxial region.

A focal length of the fifth lens L5 is f5, and the focal length of the camera optical lens 10 is f. The camera optical lens 10 further satisfies a condition of $-1.22 \le f5/f \le -0.31$. The limitations on the fifth lens L5 can effectively make a light angle of the camera optical lens 10 gentle and reduce the tolerance sensitivity. As an example, $-0.76 \le f5/f \le -0.39$.

A curvature radius of the object side surface of the fifth lens L5 is defined as R9, and a curvature radius of the image side surface of the fifth lens L5 is defined as R10. The camera optical lens 10 should satisfy a condition of $0.30 \le (R9+R10)/(R9-R10) \le 0.99$, which specifies a shape of the fifth lens L5. This can facilitate correction of an off-axis aberration with development towards ultra-thin, wide-angle lenses. As an example, $0.47 \le (R9+R10)/(R9-R10) \le 0.79$.

An on-axis thickness of the fifth lens L5 is defined as d9, and the total optical length from the object side surface of the first lens L1 to an image plane of the camera optical lens 10 along an optic axis is defined as TTL. The camera optical lens 10 should satisfy a condition of $0.03 \le d9/TTL \le 0.13$, which can achieve the ultra-thin lenses. As an example, $0.06 \le d9/TTL \le 0.10$.

In the present embodiment, an F number (FNO) of the camera optical lens 10 is smaller than or equal to 2.25, so as to achieve a large aperture.

In the present embodiment, a field of view (FOV) of the camera optical lens 10 is larger than or equal to 83°, so as to achieve a wide angle.

In the present embodiment, the focal length of the camera optical lens 10 is defined as f, and a combined focal length of the first lens L1 and the second lens L2 is defined as f12. The camera optical lens 10 should satisfy a condition of $0.46 \le f12/f \le 1.79$, which eliminates the aberration and distortion of the camera optical lens 10, suppresses the back focal length of the camera optical lens 10, and maintains the miniaturization of the camera lens system group. As an example, $0.74 \le f12/f \le 1.43$.

In addition, in the camera optical lens 10 provided by the present embodiment, the surface of each lens can be set as an aspherical surface, and it is easy for the aspherical surface to be made into a shape other than a spherical surface, to obtain more control variables for reducing aberrations, thereby reducing the number of lenses used, so that the total length of the camera optical lens 10 can be effectively reduced. In the present embodiment, both the object side surface and the image side surface of each lens are aspherical surfaces.

It should be understood that since the first lens L1, the second lens L2, the third lens L3, the fourth lens L4, and the fifth lens L5 have the structure and parameter relationship as described above, the camera optical lens 10 can appropriately distribute the refractive power, spacing and shape of each lens, and thus various aberrations are corrected.

Thus, the camera optical lens 10 can satisfy design requirements for ultra-thin, wide-angle lenses having large apertures while achieving high optical performance.

The following examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: total optical length (total optical length from the object side surface of the first lens L1 to the image plane Si of the camera optical lens along the optic axis) in mm.

In addition, an inflection point and/or an arrest point can be provided on at least one of the object side surface and the image side surface of each lens, in order to meet the requirements of high-quality imaging, and the specific implementations are described below.

The design data of the camera optical lens 10 shown in FIG. 1 is shown below.

Table 1 includes the curvature radius of the object side surface and the curvature radius R of the image side surface of the first lens L1 to the fifth lens L5 that constitute the camera optical lens 10 in the Embodiment 1 of the present invention, the on-axis thickness of each lens, the distance d between adjacent lenses, refractive index nd and abbe number vd. It should be noted that R and d are both in units of millimeter (mm).

TABLE 1

|    | R      | d            | nd  |        | vd  |       |
|----|--------|--------------|-----|--------|-----|-------|
| S1 | ∞      | d0 = -0.199  |     |        |     |       |
| R1 | 0.932  | d1 = 0.393   | nd1 | 1.5450 | v1  | 55.81 |
| R2 | 2.441  | d2 = 0.055   |     |        |     |       |
| R3 | 36.266 | d3 = 0.190   | nd2 | 1.6610 | v2  | 20.53 |

TABLE 1-continued

| | R | d | | nd | | vd |
|---|---|---|---|---|---|---|
| R4 | 7.026 | d4 = 0.230 | | | | |
| R5 | 5.273 | d5 = 0.190 | nd3 | 1.6610 | v3 | 20.53 |
| R6 | 4.466 | d6 = 0.355 | | | | |
| R7 | −2.833 | d7 = 0.451 | nd4 | 1.5450 | v4 | 55.81 |
| R8 | −0.822 | d8 = 0.224 | | | | |
| R9 | −4.978 | d9 = 0.239 | nd5 | 1.5346 | v5 | 55.69 |
| R10 | 1.022 | d10 = 0.281 | | | | |
| R11 | ∞ | d11 = 0.110 | ndg | 1.5168 | vg | 64.17 |
| R12 | ∞ | d12 = 0.467 | | | | |

In the table, meanings of various symbols are described as follows.

S1: aperture;

R: curvature radius of an optical surface, a central curvature radius of a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of an object side surface of the optical filter GF;

R12: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the optical filter GF;

d11: on-axis thickness of the optical filter GF;

d12: on-axis distance from the image side surface of the optical filter GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

nd5: refractive index of d line of the fifth lens L5;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

vg: abbe number of the optical filter GF.

Table 2 includes aspheric surface data of respective lens in the camera optical lens 10 according to Embodiment 1 of the present disclosure.

TABLE 2

| | Conic coefficient | Aspherical surface coefficients | | | |
|---|---|---|---|---|---|
| | k | A4 | A6 | A8 | A10 |
| R1 | −4.4640E−01 | −2.1410E−01 | 4.1144E+00 | −3.4144E+01 | 1.5078E+02 |
| R2 | −7.0047E+00 | −5.4981E−01 | 3.1813E+00 | −4.8203E+01 | 3.1429E+02 |
| R3 | −1.0330E+02 | −2.8722E−01 | −1.0402E+00 | 1.7274E+01 | −7.5315E+01 |
| R4 | 8.8175E+01 | −2.1972E−01 | 6.2125E+00 | −7.1355E+01 | 5.9871E+02 |
| R5 | −5.7854E+01 | −6.6180E−01 | 1.8874E+00 | −1.3571E+01 | 7.0902E+01 |
| R6 | −7.1521E+01 | −3.3313E−01 | −7.0607E−01 | 5.9713E+00 | −2.2809E+01 |
| R7 | 4.6138E+00 | −7.6786E−02 | −6.1047E−02 | −5.9345E−02 | 6.0939E−01 |
| R8 | −7.9769E−01 | 5.5451E−01 | −1.1856E+00 | 2.7144E+00 | −3.8039E+00 |
| R9 | −1.1944E−01 | −3.1047E−01 | 4.0559E−01 | −2.3167E−01 | 7.2429E−02 |
| R10 | −1.0276E+01 | −2.2013E−01 | 1.9099E−01 | −1.1629E−01 | 4.5494E−02 |

| | Conic coefficient | Aspherical surface coefficients | | |
|---|---|---|---|---|
| | k | A12 | A14 | A16 |
| R1 | −4.4640E−01 | −3.7351E+02 | 4.6790E+02 | −2.3521E+02 |
| R2 | −7.0047E+00 | −1.0143E+03 | 1.6305E+03 | −1.0495E+03 |
| R3 | −1.0330E+02 | 2.4642E+02 | −4.9266E+02 | 4.1395E+02 |
| R4 | 8.8175E+01 | −2.6249E+03 | 5.7487E+03 | −4.9596E+03 |
| R5 | −5.7854E+01 | −2.1509E+02 | 3.5231E+02 | −2.4140E+02 |
| R6 | −7.1521E+01 | 4.7836E+01 | −4.9546E+01 | 1.9747E+01 |
| R7 | 4.6138E+00 | −3.2954E+00 | 4.5523E+00 | −1.8071E+00 |
| R8 | −7.9769E−01 | 3.0680E+00 | −1.3352E+00 | 2.4214E−01 |

TABLE 2-continued

| | | | |
|---|---|---|---|
| R9 | −1.1944E−01 | −1.2869E−02 | 1.2326E−03 | −4.9887E−05 |
| R10 | −1.0276E+01 | −1.0789E−02 | 1.3770E−03 | −7.1289E−05 |

In Table 2, k is a conic coefficient, and A4, A6, A8, A10, A12, A14, and A16 are aspheric surface coefficients.

IH: image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \qquad (5)$$

In the present embodiment, an aspheric surface of each lens surface is the aspheric surfaces represented by the above condition (5). However, the present disclosure is not limited to the aspherical polynomial form represented by the condition (5).

Table 3 and Table 4 show design data of inflexion points and arrest points of respective lens in the camera optical lens 10 of the present embodiment. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; P4R1 and P4R2 represent the object side surface and the image side surface of the fourth lens L4, respectively; and P5R1 and P5R2 represent the object side surface and the image side surface of the fifth lens L5, respectively. The data in the column "inflexion point position" indicates vertical distances from inflexion points arranged on each lens surface to the optic axis of the camera optical lens 10. The data in the column "arrest point position" indicates vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 0.555 | | |
| P1R2 | 1 | 0.255 | | |
| P2R1 | 2 | 0.095 | 0.345 | |
| P2R2 | 0 | | | |
| P3R1 | 1 | 0.165 | | |
| P3R2 | 2 | 0.205 | 0.855 | |
| P4R1 | 2 | 0.875 | 1.035 | |
| P4R2 | 1 | 1.195 | | |
| P5R1 | 3 | 0.845 | 1.395 | 1.585 |
| P5R2 | 2 | 0.385 | 1.985 | |

TABLE 4

| | Number of arrest points | Arrest point position 1 | Arrest point position 2 |
|---|---|---|---|
| P1R1 | 0 | | |
| P1R2 | 1 | 0.445 | |
| P2R1 | 2 | 0.145 | 0.425 |
| P2R2 | 0 | | |
| P3R1 | 1 | 0.285 | |
| P3R2 | 1 | 0.355 | |
| P4R1 | 0 | | |
| P4R2 | 0 | | |
| P5R1 | 1 | 1.955 | |
| P5R2 | 1 | 0.975 | |

Table 13 below further lists various values of Embodiments 1, 2 and 3 and parameters which are specified in the above conditions.

As shown in Table 3, Embodiment 1 satisfies the various conditions.

Figure 2:
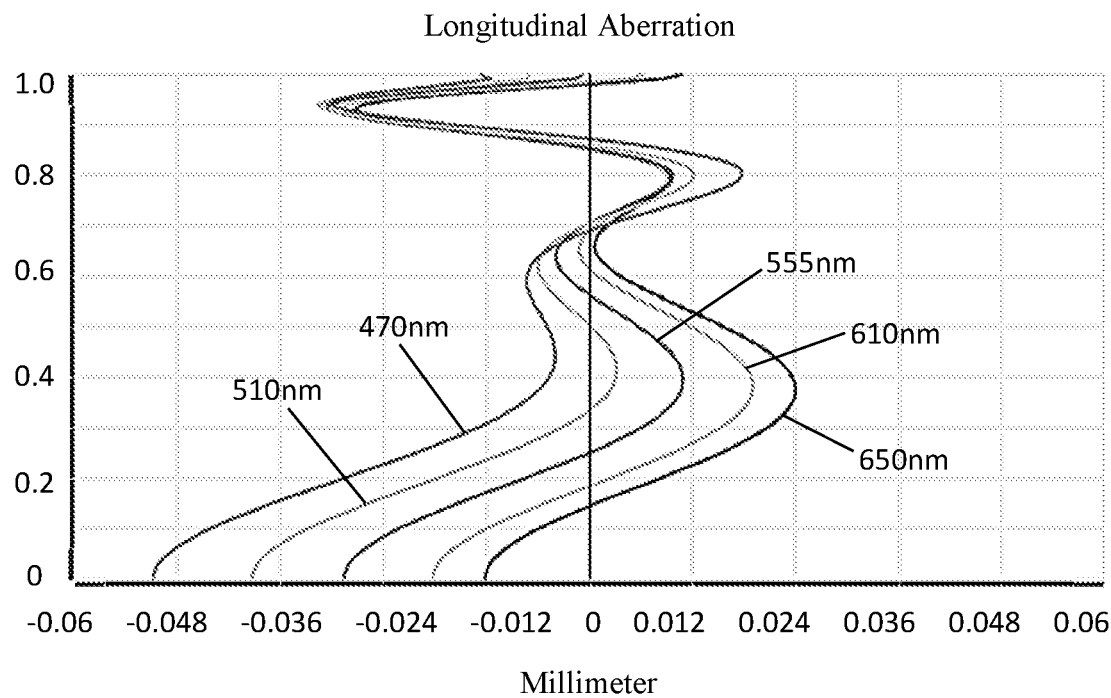
FIG. 2 is a schematic diagram of a longitudinal aberration of the camera optical lens shown in FIG. 1.
Figure 3:
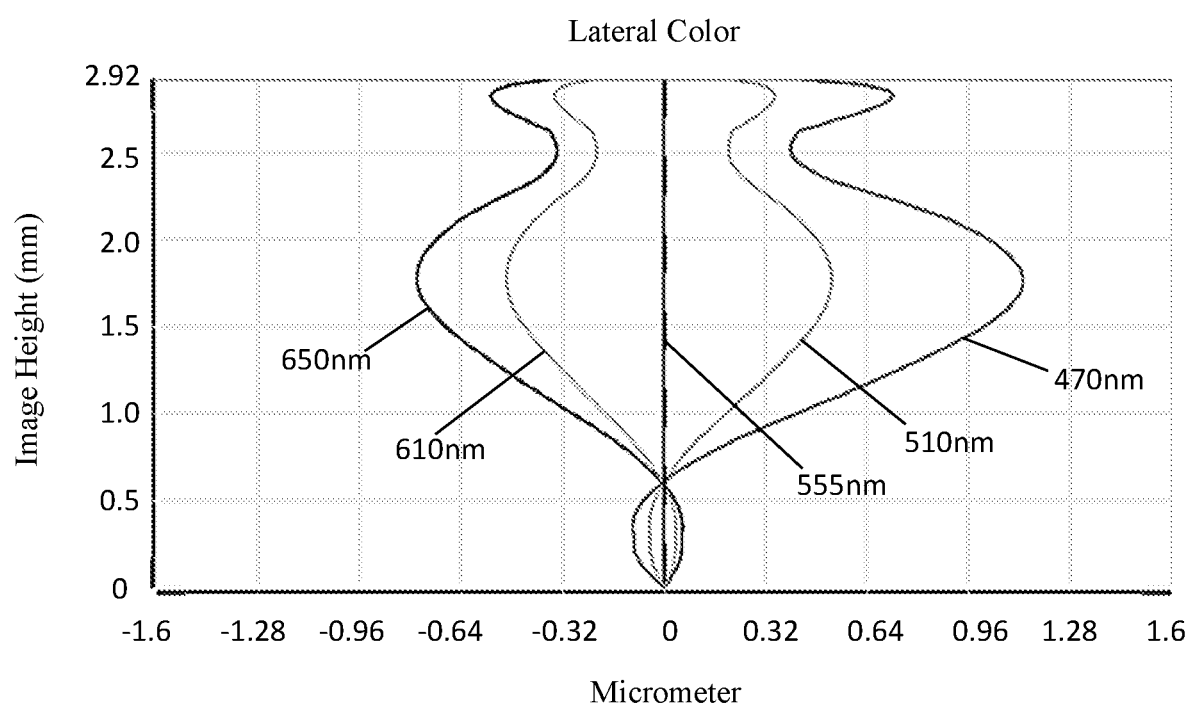
FIG. 3 is a schematic diagram of a lateral color of the camera optical lens shown in FIG. 1.
Figure 4:
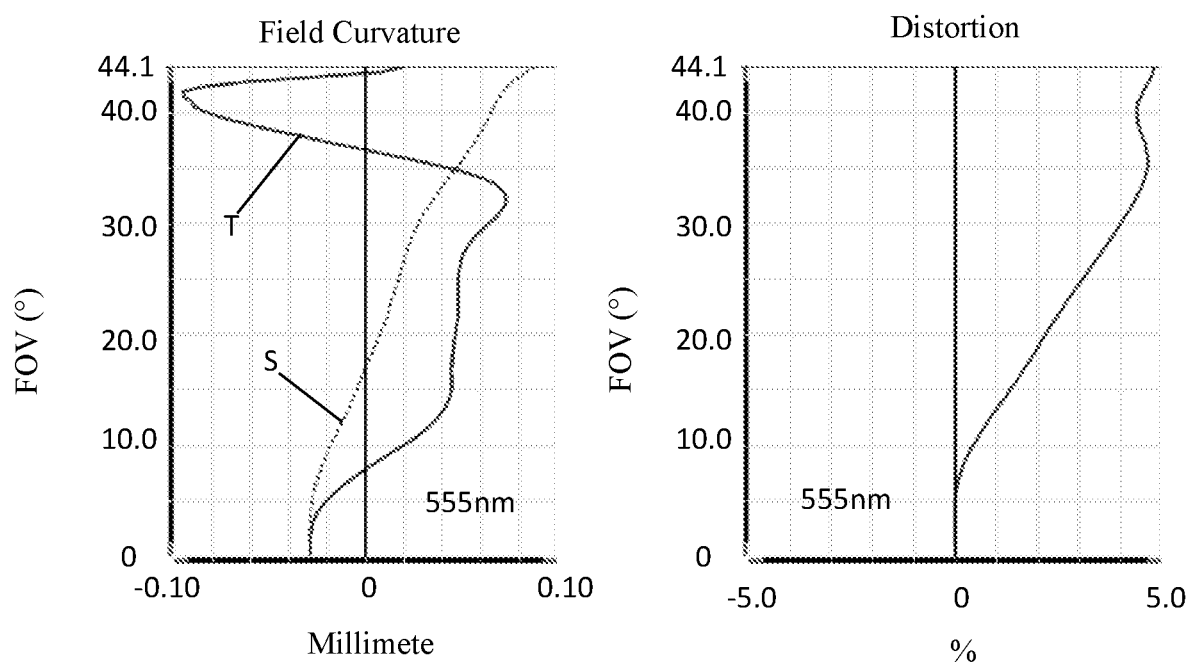
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 610 nm, 555 nm, 510 nm, 470 nm after passing the camera optical lens 10. FIG. 4 illustrates a field curvature and a distortion of light with a wavelength of 555 nm after passing the camera optical lens 10, in which a field curvature S is a field curvature in a sagittal direction and T is a field curvature in a tangential direction.

In the present embodiment, the entrance pupil diameter of the camera optical lens 10 is 1.256 mm. The image height is 2.92 mm. A field of view (FOV) along a diagonal direction is 88.20°. Thus, the camera optical lens 10 is an ultra-thin, large-aperture, wide-angle lens in which the on-axis and off-axis aberrations are sufficiently corrected, thereby leading to better optical characteristics.

Embodiment 2

Figure 5:
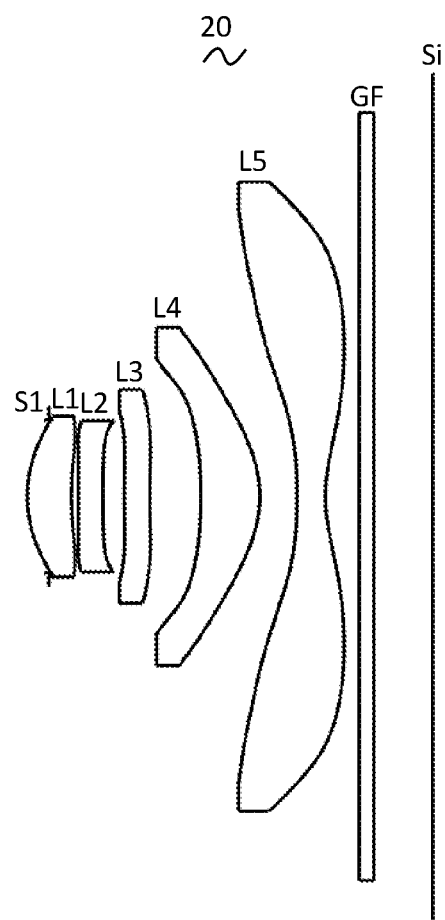
FIG. 5 is a schematic diagram of a structure of a camera optical lens in accordance with Embodiment 2 of the present disclosure.

FIG. 5 is a structural schematic diagram of the camera optical lens 20 in Embodiment 2. Embodiment 2 is basically the same as Embodiment 1 and involves symbols having the same meanings as Embodiment 1, and the same portions will not be repeated. Only differences therebetween will be described in the following.

Table 5 and Table 6 show design data of a camera optical lens 20 in Embodiment 2 of the present disclosure.

TABLE 5

| | R | d | nd | | vd | |
|---|---|---|---|---|---|---|
| S1 | ∞ | d0 = −0.158 | | | | |
| R1 | 0.887 | d1 = 0.322 | nd1 | 1.5450 | v1 | 55.81 |
| R2 | 2.058 | d2 = 0.052 | | | | |
| R3 | 851.553 | d3 = 0.177 | nd2 | 1.6610 | v2 | 20.53 |
| R4 | 12.627 | d4 = 0.156 | | | | |
| R5 | 6.143 | d5 = 0.186 | nd3 | 1.6610 | v3 | 20.53 |
| R6 | 6.022 | d6 = 0.372 | | | | |
| R7 | −3.213 | d7 = 0.431 | nd4 | 1.5450 | v4 | 55.81 |
| R8 | −0.794 | d8 = 0.269 | | | | |
| R9 | −3.985 | d9 = 0.206 | nd5 | 1.5346 | v5 | 55.69 |
| R10 | 1.021 | d10 = 0.246 | | | | |
| R11 | ∞ | d11 = 0.110 | ndg | 1.5168 | vg | 64.17 |
| R12 | ∞ | d12 = 0.427 | | | | |

Table 6 shows aspheric surface data of respective lenses in the camera optical lens 20 according to Embodiment 2 of the present disclosure.

TABLE 6

| | Conic coefficient | Aspherical surface coefficients | | | |
|---|---|---|---|---|---|
| | k | A4 | A6 | A8 | A10 |
| R1 | −5.0190E−01 | −2.4965E−01 | 4.2257E+00 | −3.3969E+01 | 1.4910E+02 |
| R2 | −2.8176E+00 | −5.3267E−01 | 2.9369E+00 | −4.8695E+01 | 3.1373E+02 |
| R3 | 1.7999E+02 | −1.7133E−01 | −9.9705E−01 | 1.7719E+01 | −7.3550E+01 |
| R4 | 7.8498E+01 | −1.4724E−01 | 6.8986E+00 | −7.1732E+01 | 5.9559E+02 |
| R5 | −1.8000E+02 | −6.1829E−01 | 1.9731E+00 | −1.3975E+01 | 7.1117E+01 |
| R6 | 1.6992E+01 | −3.641 IE−01 | −7.2784E−01 | 6.1395E+00 | −2.2850E+01 |
| R7 | 3.8049E+00 | −8.8530E−02 | −3.1843E−02 | −4.0434E−02 | 6.1017E−01 |
| R8 | −7.9703E−01 | 5.4199E−01 | −1.1746E+00 | 2.7188E+00 | −3.8027E+00 |
| R9 | −6.1205E−01 | −3.1036E−01 | 4.0694E−01 | −2.3153E−01 | 7.2404E−02 |
| R10 | −1.0171E+01 | −2.0837E−01 | 1.8905E−01 | −1.1614E−01 | 4.553 IE−02 |

| | Conic coefficient | Aspherical surface coefficients | | |
|---|---|---|---|---|
| | k | A12 | A14 | A16 |
| R1 | −5.0190E−01 | −3.8010E+02 | 4.6060E+02 | −2.0411E+02 |
| R2 | −2.8176E+00 | −1.0107E+03 | 1.6455E+03 | −1.0952E+03 |
| R3 | 1.7999E+02 | 2.4590E+02 | −5.0760E+02 | 4.4267E+02 |
| R4 | 7.8498E+01 | −2.6140E+03 | 5.8289E+03 | −5.1671E+03 |
| R5 | −1.8000E+02 | −2.1321E+02 | 3.5344E+02 | −2.5402E+02 |
| R6 | 1.6992E+01 | 4.7508E+01 | −4.9836E+01 | 2.0092E+01 |
| R7 | 3.8049E+00 | −3.3082E+00 | 4.5324E+00 | −1.8215E+00 |
| R8 | −7.9703E−01 | 3.0683E+00 | −1.3347E+00 | 2.4289E−01 |
| R9 | −6.1205E−01 | −1.2883E−02 | 1.2310E−03 | −4.9595E−05 |
| R10 | −1.0171E+01 | −1.0795E−02 | 1.3752E−03 | −7.1422E−05 |

Table 7 and Table 8 show design data of inflexion points and arrest points of respective lens in the camera optical lens 20.

TABLE 7

| | Number of inflexion points | Inflexion point position 1 | Inflexion point position 2 |
|---|---|---|---|
| P1R1 | 1 | 0.495 | |
| P1R2 | 1 | 0.265 | |
| P2R1 | 2 | 0.025 | 0.305 |
| P2R2 | 0 | | |
| P3R1 | 1 | 0.155 | |
| P3R2 | 1 | 0.195 | |
| P4R1 | 1 | 0.885 | |
| P4R2 | 1 | 1.145 | |
| P5R1 | 2 | 0.855 | 1.985 |
| P5R2 | 1 | 0.395 | |

TABLE 8

| | Number of arrest points | Arrest point position 1 | Arrest point position 2 |
|---|---|---|---|
| P1R1 | 0 | | |
| P1R2 | 1 | 0.455 | |
| P2R1 | 2 | 0.045 | 0.365 |
| P2R2 | 0 | | |
| P3R1 | 1 | 0.265 | |
| P3R2 | 1 | 0.325 | |
| P4R1 | 0 | | |
| P4R2 | 0 | | |
| P5R1 | 0 | | |
| P5R2 | 1 | 1.075 | |

Table 13 below further lists various values of Embodiment 2 and parameters which are specified in the above conditions. Obviously, the camera optical lens of the present embodiment satisfies the various conditions.

Figure 6:
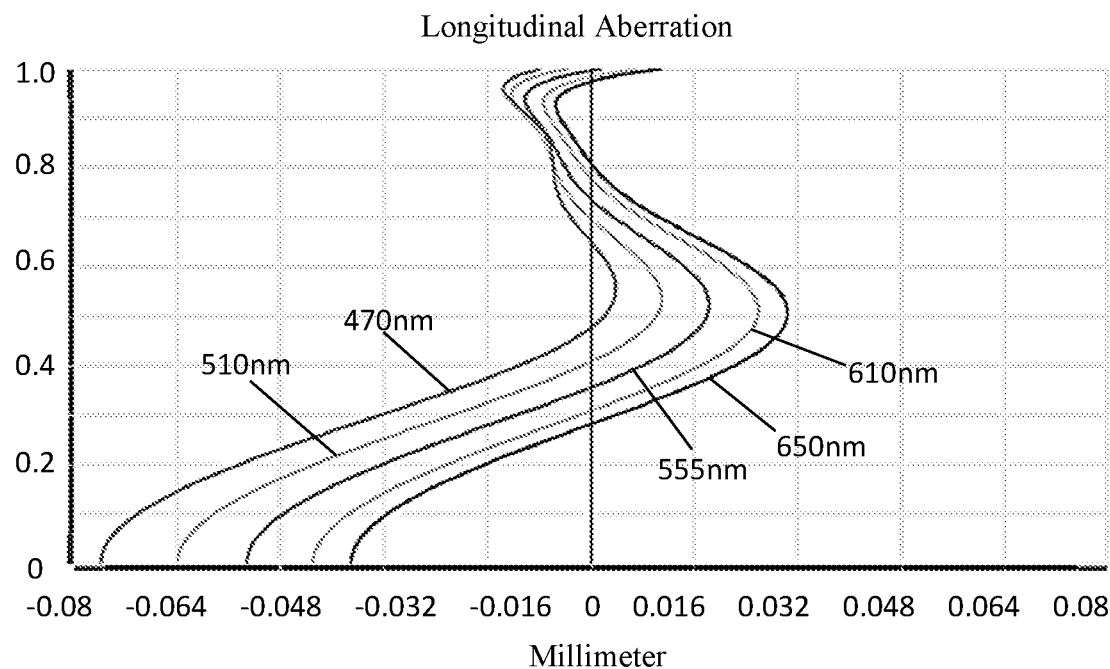
FIG. 6 is a schematic diagram of a longitudinal aberration of the camera optical lens shown in FIG. 5.
Figure 7:
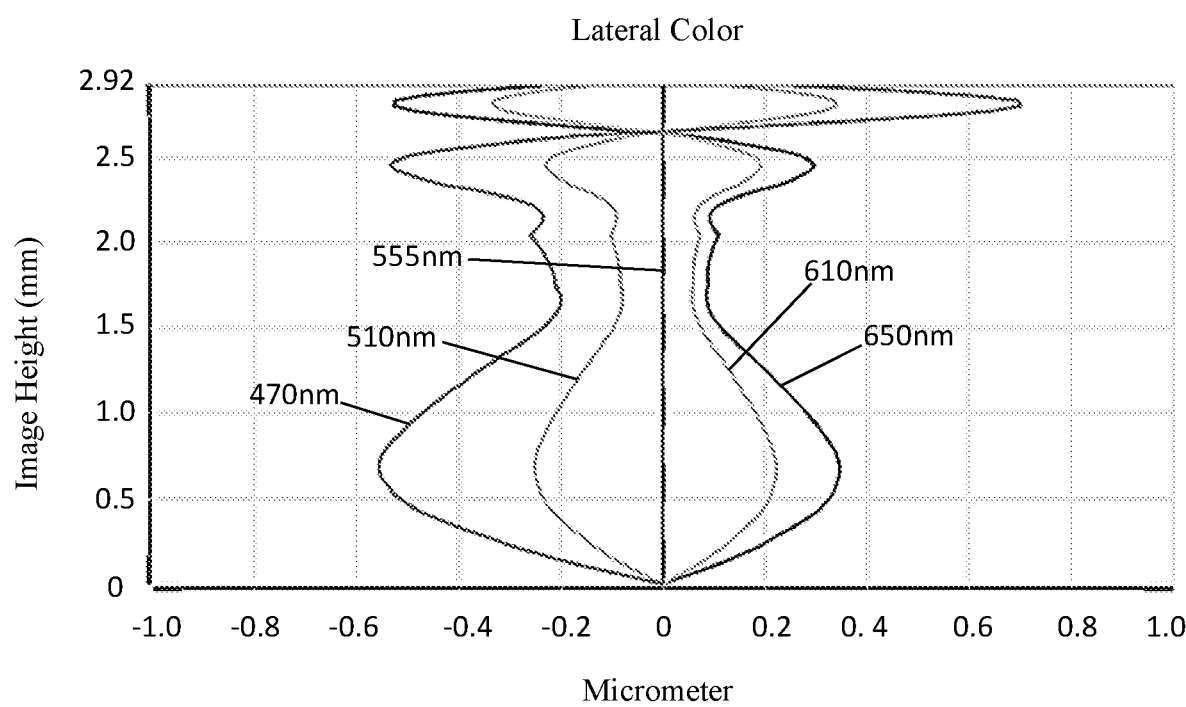
FIG. 7 is a schematic diagram of a lateral color of the camera optical lens shown in FIG. 5.
Figure 8:
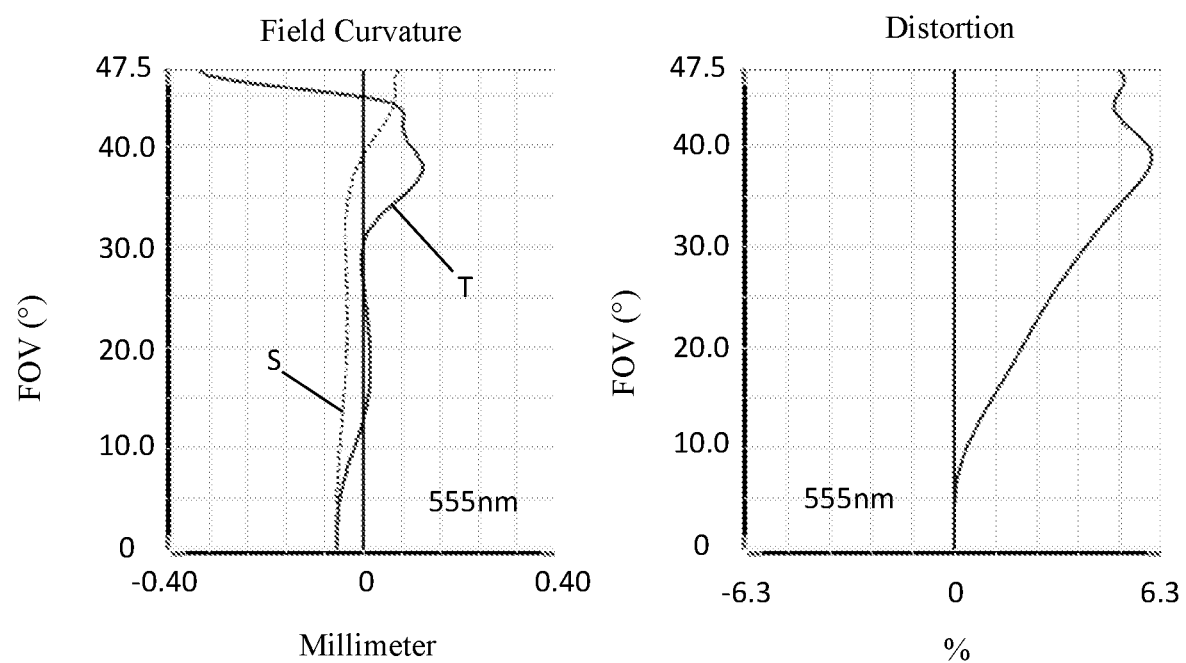
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm, and 470 nm after passing the camera optical lens 20. FIG. 8 illustrates a field curvature and a distortion of light with a wavelength of 555 nm after passing the camera optical lens 20, in which a field curvature S is a field curvature in a sagittal direction and T is a field curvature in a tangential direction.

In the present embodiment, the entrance pupil diameter of the camera optical lens 20 is 1.100 mm. The image height is 2.92 mm. The FOV along a diagonal direction is 95.00°. Thus, Thus, the camera optical lens 20 is an ultra-thin, large-aperture, wide-angle lens in which the on-axis and off-axis aberrations are sufficiently corrected, thereby leading to better optical characteristics.

Embodiment 3

Figure 9:
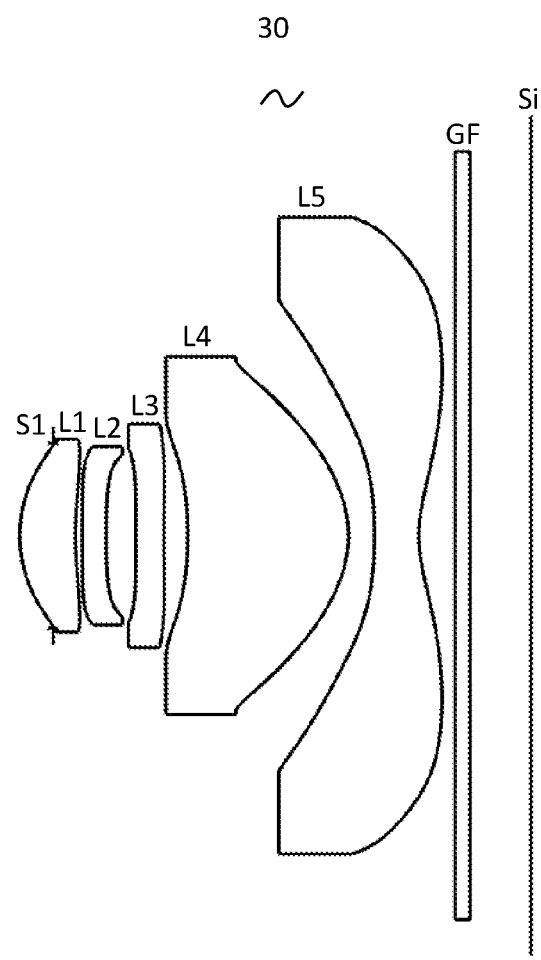
FIG. 9 is a schematic diagram of a structure of a camera optical lens in accordance with Embodiment 3 of the present disclosure.

FIG. 9 is a structural schematic diagram of the camera optical lens 30 in Embodiment 3. Embodiment 3 is basically the same as Embodiment 1 and involves symbols having the same meanings as Embodiment 1, and the same portions will not be repeated. Only differences therebetween will be described in the following.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0 = | −0.245 | | | |
| R1 | 0.936 | d1 = | 0.408 | nd1 | 1.5450 | v1 55.81 |
| R2 | 2.548 | d2 = | 0.050 | | | |
| R3 | 18.445 | d3 = | 0.176 | nd2 | 1.6610 | v2 20.53 |
| R4 | 7.425 | d4 = | 0.216 | | | |
| R5 | 55.372 | d5 = | 0.206 | nd3 | 1.6610 | v3 20.53 |
| R6 | 11.251 | d6 = | 0.174 | | | |
| R7 | −2.853 | d7 = | 1.181 | nd4 | 1.5450 | v4 55.81 |
| R8 | −0.798 | d8 = | 0.190 | | | |
| R9 | −3.824 | d9 = | 0.327 | nd5 | 1.5346 | v5 55.69 |
| R10 | 0.959 | d10 = | 0.266 | | | |
| R11 | ∞ | d11 = | 0.110 | ndg | 1.5168 | vg 64.17 |
| R12 | ∞ | d12 = | 0.448 | | | |

Table 10 shows aspheric surface data of respective lenses in the camera optical lens 30 according to Embodiment 3 of the present disclosure.

TABLE 10

| | Conic coefficient | Aspherical surface coefficients | | | |
|---|---|---|---|---|---|
| | k | A4 | A6 | A8 | A10 |
| R1 | −3.5756E−01 | −2.3876E−01 | 4.3249E+00 | −3.3944E+01 | 1.4931E+02 |
| R2 | 2.8785E+00 | −4.6368E−01 | 3.4805E+00 | −4.8421E+01 | 3.1241E+02 |
| R3 | 1.8000E+02 | −2.4105E−02 | −1.3192E+00 | 1.6605E+01 | −7.5417E+01 |
| R4 | 1.4173E+02 | −2.3312E−02 | 6.0946E+00 | −7.4337E+01 | 6.0130E+02 |
| R5 | −1.4403E+02 | −3.8280E−01 | 1.8396E+00 | −1.4709E+01 | 6.9669E+01 |
| R6 | 1.0057E+02 | −1.4514E−01 | −7.0369E−01 | 6.0729E+00 | −2.3056E+01 |
| R7 | 5.6278E−01 | −2.0287E−01 | −1.1006E−02 | 2.1258E−01 | 9.4542E−01 |
| R8 | −6.5309E−01 | 4.4794E−01 | −1.1910E+00 | 2.7522E+00 | −3.7881E+00 |
| R9 | 1.7732E+00 | −3.6568E−01 | 4.1305E−01 | −2.2991E−01 | 7.2289E−02 |
| R10 | −8.2915E+00 | −2.1006E−01 | 1.9461E−01 | −1.1867E−01 | 4.5666E−02 |

| | Conic coefficient | Aspherical surface coefficients | | |
|---|---|---|---|---|
| | k | A12 | A14 | A16 |
| R1 | −3.5756E−01 | −3.7247E+02 | 4.8390E+02 | −2.5907E+02 |
| R2 | 2.8785E+00 | −1.0131E+03 | 1.6443E+03 | −1.0748E+03 |
| R3 | 1.8000E+02 | 2.5174E+02 | −4.7698E+02 | 3.6389E+02 |
| R4 | 1.4173E+02 | −2.6011E+03 | 5.7408E+03 | −5.0055E+03 |
| R5 | −1.4403E+02 | −2.1081E+02 | 3.6436E+02 | −2.8443E+02 |
| R6 | 1.0057E+02 | 4.6968E+01 | −5.0240E+01 | 2.2066E+01 |
| R7 | 5.6278E−01 | −3.1188E+00 | 4.4422E+00 | −2.3138E+00 |
| R8 | −6.5309E−01 | 3.0704E+00 | −1.3354E+00 | 2.4222E−01 |
| R9 | 1.7732E+00 | −1.2972E−02 | 1.2236E−03 | −4.1056E−05 |
| R10 | −8.2915E+00 | −1.0722E−02 | 1.3749E−03 | −7.3048E−05 |

Table 11 and Table 12 show design data of inflexion points and arrest points of respective lens in the camera optical lens 30.

TABLE 11

| | Number of inflexion points | Inflexion point position 1 | Inflexion point position 2 |
|---|---|---|---|
| P1R1 | 1 | 0.615 | |
| P1R2 | 1 | 0.305 | |
| P2R1 | 0 | | |
| P2R2 | 0 | | |
| P3R1 | 1 | 0.065 | |
| P3R2 | 2 | 0.215 | 0.785 |
| P4R1 | 1 | 0.675 | |
| P4R2 | 1 | 1.145 | |
| P5R1 | 1 | 1.605 | |
| P5R2 | 1 | 0.415 | |

TABLE 12

| | Number of arrest points | Arrest point position 1 |
|---|---|---|
| P1R1 | 0 | |
| P1R2 | 1 | 0.605 |
| P2R1 | 0 | |
| P2R2 | 0 | |
| P3R1 | 1 | 0.115 |
| P3R2 | 1 | 0.375 |
| P4R1 | 0 | |
| P4R2 | 1 | 1.285 |
| P5R1 | 0 | |
| P5R2 | 1 | 1.185 |

Table 13 below further lists various values of Embodiment 3 and parameters which are specified in the above conditions. Obviously, the camera optical lens of the present embodiment satisfies the various conditions.

Figure 10:
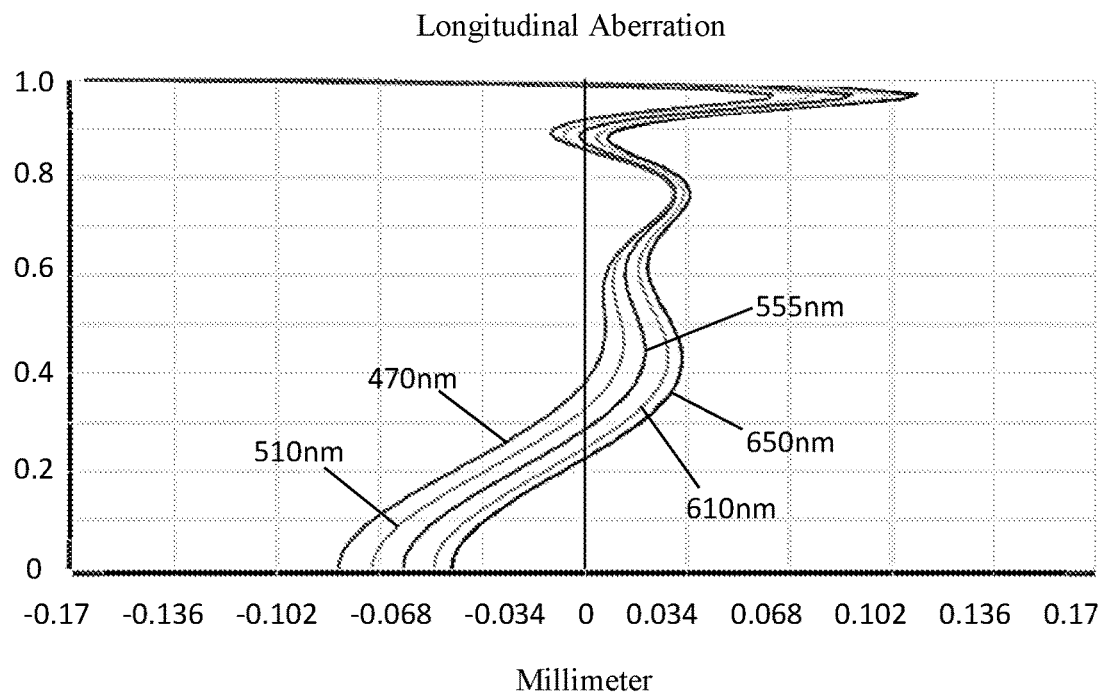
FIG. 10 is a schematic diagram of a longitudinal aberration of the camera optical lens shown in FIG. 9.
Figure 11:
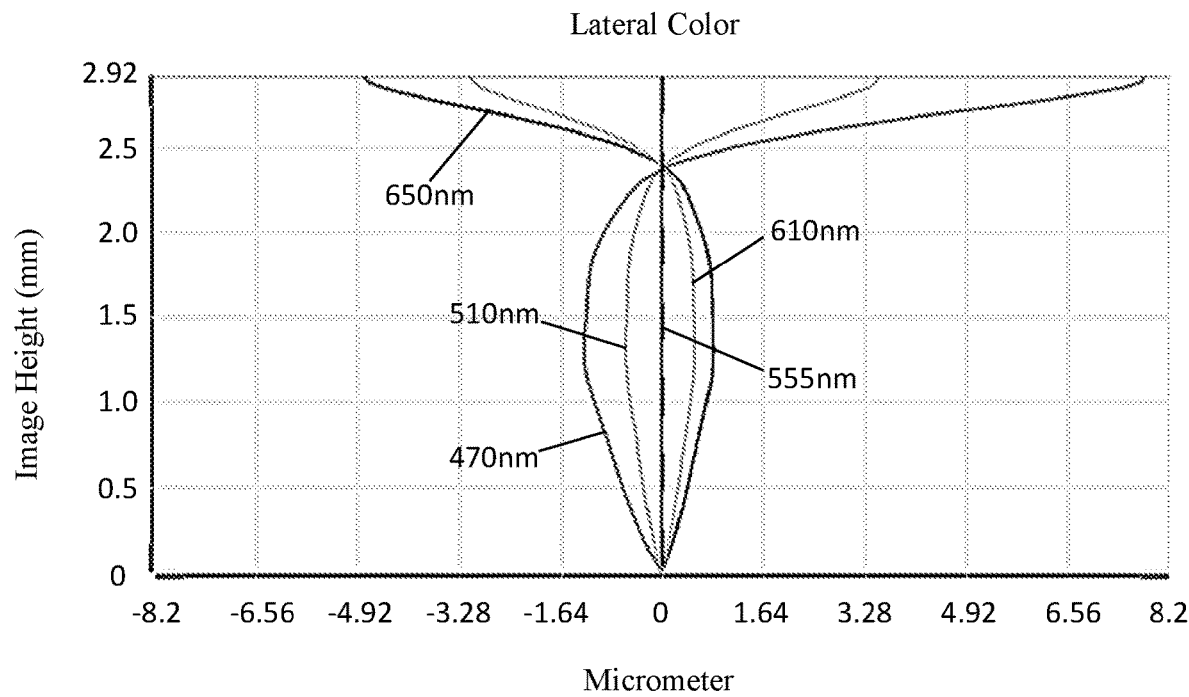
FIG. 11 is a schematic diagram of a lateral color of the camera optical lens shown in FIG. 9.
Figure 12:
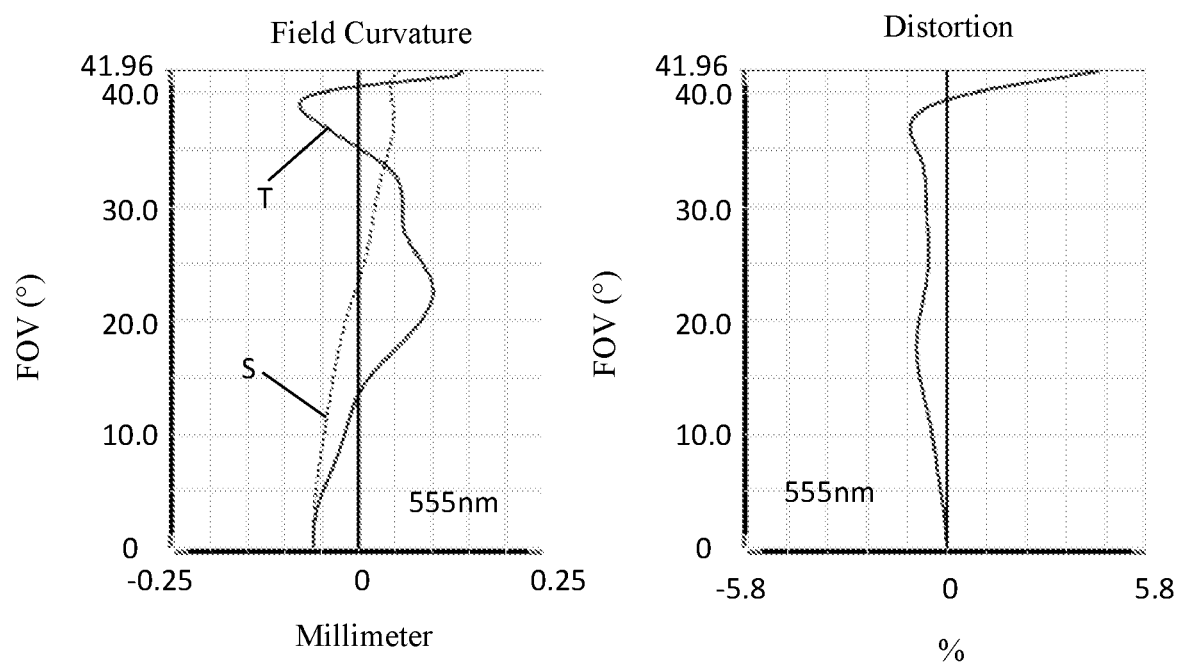
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm and 470 nm after passing the camera optical lens 30. FIG. 12 illustrates a field curvature and a distortion of light with a wavelength of 555 nm after passing the camera optical lens 30, in which a field curvature S is a field curvature in a sagittal direction and T is a field curvature in a tangential direction.

In the present embodiment, the entrance pupil diameter of the camera optical lens 30 is 1.340 mm. The image height is 2.92 mm. The FOV along a diagonal direction is 83.92°. Thus, Thus, the camera optical lens 30 is an ultra-thin, large-aperture, wide-angle lens in which the on-axis and off-axis aberrations are sufficiently corrected, thereby leading to better optical characteristics.

Table 13 below further lists various values of Embodiment 1, Embodiment 2, and Embodiment 3 and parameters which are specified in the above conditions.

TABLE 13

| Parameters and Conditions | Embodiment 1 | Embodiment 2 | Embodiment 3 |
|---|---|---|---|
| (R5 + R6)/(R5 − R6) | 12.07 | 100.54 | 1.51 |
| d4/d6 | 0.65 | 0.42 | 1.24 |
| TTL/IH | 1.09 | 1.01 | 1.28 |
| (R3 + R4)/(R3 − R4) | 1.48 | 1.03 | 2.35 |
| f | 2.802 | 2.453 | 2.987 |
| f1 | 2.526 | 2.600 | 2.485 |
| f2 | −13.104 | −19.224 | −18.759 |
| f3 | −48.340 | −1173.919 | −21.218 |
| f4 | 1.961 | 1.813 | 1.683 |
| f5 | −1.559 | −1.494 | −1.396 |
| f12 | 2.968 | 2.920 | 2.760 |
| Fno | 2.23 | 2.23 | 2.23 |

The above are only the embodiments of the present disclosure. It should be understood that those of ordinary skill in the art can make improvements without departing from the inventive concept of the present disclosure, and these improvements all belong to the scope of the present disclosure.

What is claimed is:

1. A camera optical lens, comprising, from an object side to an image side:
   a first lens having a positive refractive power;
   a second lens having a negative refractive power;
   a third lens having a negative refractive power;
   a fourth lens having a positive refractive power; and
   a fifth lens having a negative refractive power,
   wherein the camera optical lens satisfies following conditions:

$1.50 \leq (R5+R6)/(R5-R6)$;

$0.40 \leq d4/d6 \leq 1.25$;

$1.00 \leq TTL/IH \leq 1.30$; and $1.00 \leq (R3+R4)/(R3-R4) \leq 2.40$, where
   R3 denotes a curvature radius of an object side surface of the second lens;
   R4 denotes a curvature radius of an image side surface of the second lens;
   R5 denotes a curvature radius of an object side surface of the third lens;
   R6 denotes a curvature radius of an image side surface of the third lens;
   d4 denotes an on-axis distance from the image side surface of the second lens to the object side surface of the third lens;
   d6 denotes an on-axis distance from the image side surface of the third lens to an object side surface of the fourth lens;
   IH denotes an image height of the camera optical lens; and
   TTL denotes a total optical length from an object side surface of the first lens to an image plane of the camera optical lens along an optic axis.

2. The camera optical lens as described in claim 1, further satisfying a following condition:

$0.80 \leq f1/f \leq 1.10$, where
   f denotes a focal length of the camera optical lens; and
   f1 denotes a focal length of the first lens.

3. The camera optical lens as described in claim 1, further satisfying following conditions:

$-5.03 \leq (R1+R2)/(R1-R2) \leq -1.44$; and $0.05 \leq d1/TTL \leq 0.19$, where
   R1 denotes a curvature radius of the object side surface of the first lens;
   R2 denotes a curvature radius of an image side surface of the first lens; and
   d1 denotes an on-axis thickness of the first lens.

4. The camera optical lens as described in claim 1, further satisfying following conditions:

$-15.67 \leq f2/f \leq -3.12$; and $0.02 \leq d3/TTL \leq 0.09$, where
   f denotes a focal length of the camera optical lens;
   f2 denotes a focal length of the second lens; and
   d3 denotes an on-axis thickness of the second lens.

5. The camera optical lens as described in claim 1, further satisfying following conditions:

$-957.13 \leq f3/f \leq -4.74$; and $0.03 \leq d5/TTL \leq 0.09$, where
   f denotes a focal length of the camera optical lens;
   f3 denotes a focal length of the third lens; and
   d5 denotes an on-axis thickness of the third lens.

6. The camera optical lens as described in claim 1, further satisfying following conditions:

$0.28 \leq f4/f \leq 1.11$;

$0.83 \leq (R7+R8)/(R7-R8) \leq 2.73$; and $0.07 \leq d7/TTL \leq 0.47$, where
   f denotes a focal length of the camera optical lens;
   f4 denotes a focal length of the fourth lens;
   R7 denotes a curvature radius of the object side surface of the fourth lens;
   R8 denotes a curvature radius of an image side surface of the fourth lens; and
   d7 denotes an on-axis thickness of the fourth lens.

7. The camera optical lens as described in claim 1, further satisfying following conditions:

$-1.22 \leq f5/f \leq -0.31$;

$0.30 \leq (R9+R10)/(R9-R10) \leq 0.99$; and $0.03 \leq d9/TTL \leq 0.13$, where
   f denotes a focal length of the camera optical lens;
   f5 denotes a focal length of the fifth lens;
   R9 denotes a curvature radius of an object side surface of the fifth lens;
   R10 denotes a curvature radius of an image side surface of the fifth lens; and
   d9 denotes an on-axis thickness of the fifth lens.

8. The camera optical lens as described in claim 1, further satisfying a following condition:

$FNO \leq 2.25$, where
   FNO denotes an F number of the camera optical lens.

9. The camera optical lens as described in claim 1, further satisfying a following condition:

$FOV \geq 83°$, where
   FOV denotes a field of view of the camera optical lens.

10. The camera optical lens as described in claim 1, further satisfying a following condition:

$0.46 \leq f12/f \leq 1.79$, where
    f denotes a focal length of the camera optical lens; and
    f12 denotes a combined focal length of the first lens and the second lens.

* * * * *